J. STUART.
CAR WHEEL EQUIPMENT.
APPLICATION FILED DEC. 30, 1909.
986,323.
Patented Mar. 7, 1911.
2 SHEETS—SHEET 1.
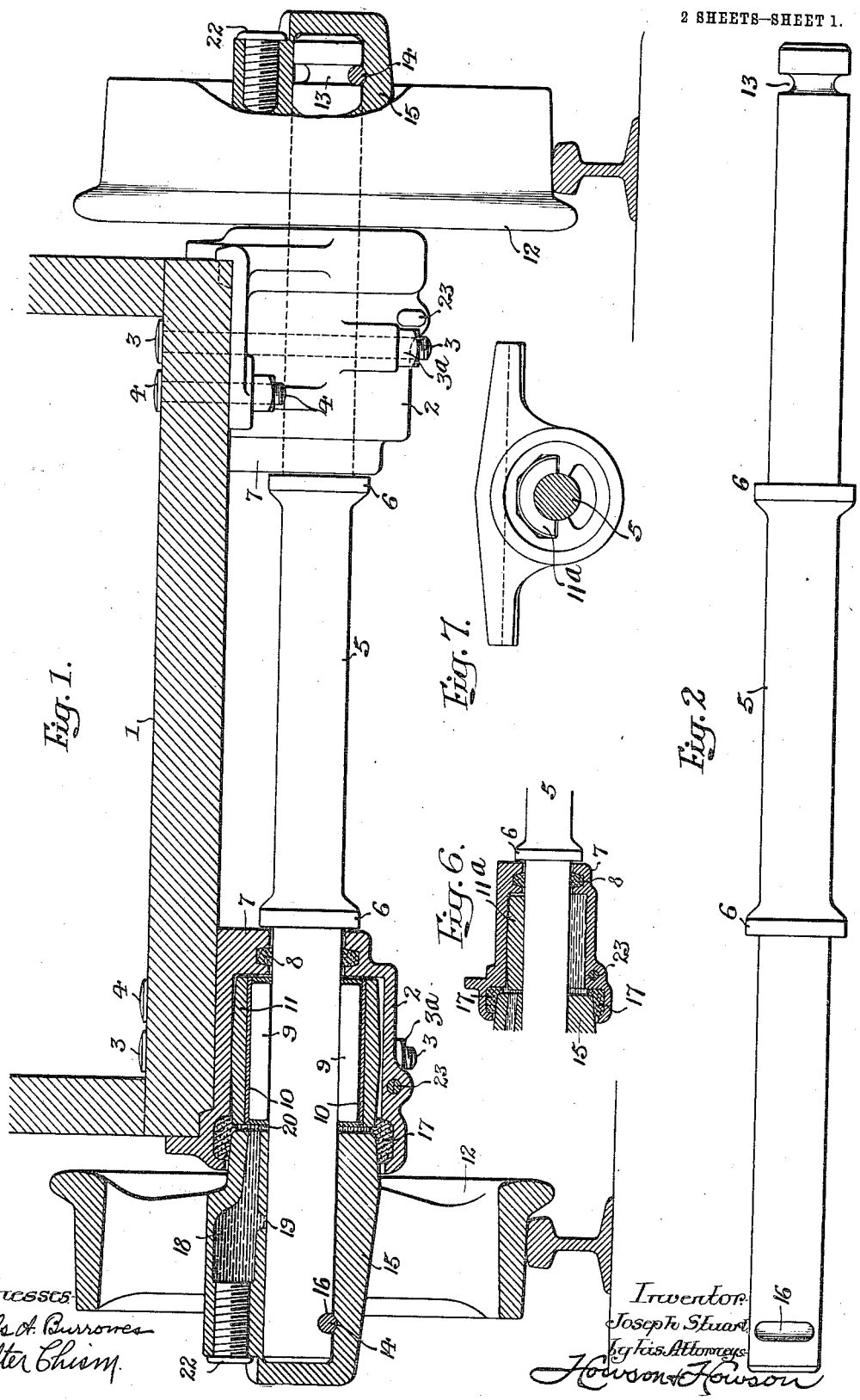
Witnesses
Wells A. Burrowes
Walter Chism
Inventor
Joseph Stuart
by his Attorneys
Howson & Howson

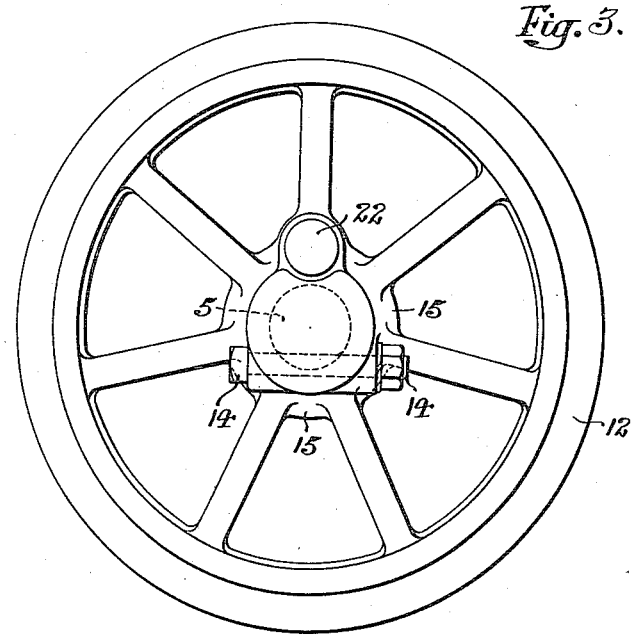
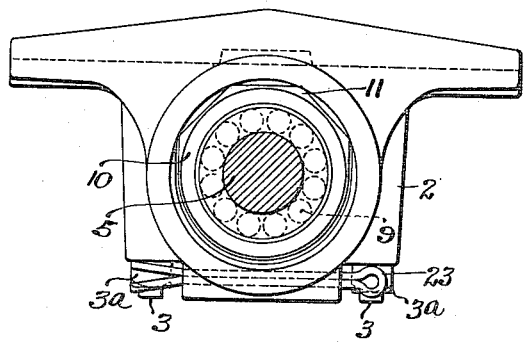
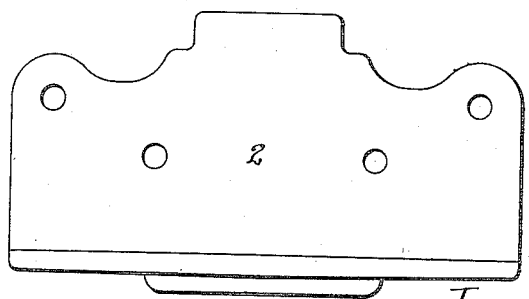

UNITED STATES PATENT OFFICE.

JOSEPH STUART, OF WILMINGTON, DELAWARE, ASSIGNOR TO LOBDELL CAR WHEEL COMPANY, OF WILMINGTON, DELAWARE, A CORPORATION OF DELAWARE.

CAR-WHEEL EQUIPMENT.

986,323.         Specification of Letters Patent.    Patented Mar. 7, 1911.

Application filed December 30, 1909. Serial No. 535,618.

*To all whom it may concern:*

Be it known that I, JOSEPH STUART, a citizen of the United States, and a resident of Wilmington, Delaware, have invented certain Improvements in Car-Wheel Equipments, of which the following is a specification.

One object of my invention is to provide a relatively simple and substantial wheel equipment particularly designed for use on mine cars though not limited to such use; the arrangement of parts being such as will permit the easy passage of the cars around curves of relatively short radius.

I further desire to provide a wheel equipment having improved means for supplying lubricant to the various surfaces requiring the same and designed to prevent loss or leakage of the lubricant from the interior of the wheels and journal boxes.

Another object of the invention is the provision of a wheel equipment in which one of the wheels shall be fixed to the axle while the other shall be free to turn thereon; the construction being such, however, that both wheels shall be identical as to their construction.

These objects and other advantageous ends I secure as hereinafter set forth, reference being had to the accompanying drawings, in which;—

Figure 1, is a vertical section illustrating a portion of a mine car provided with my improved wheel equipment;—Fig. 2, is a side elevation of the axle forming part of my invention; Fig. 3, is a side elevation of one of the wheels; Fig. 4, is an end elevation of one of the journal boxes, showing the axle in section, Fig. 5, is a plan of the journal box shown in Fig. 4, and Figs. 6 and 7 are respectively a vertical section and an end elevation illustrating a modified form of a portion of my invention.

In the above drawings, 1 represents the body of a mine or other car, the opposite sides of which are provided with journal boxes 2 each held to said body by two long bolts 3 and two short bolts 4. The axle 5 extends into and through said journal boxes and has two flanges 6 immediately adjacent to their inner or adjacent faces. These faces are formed by inwardly extending flanges 7 each of which has a circular opening for the passage of the axle and is provided with an interior annular recess for the reception of a ring 8 of packing designed to bear upon the axle adjacent to the flange 6 to prevent leakage from the journal box along the axle and also to exclude dirt or grit. Each of the journal boxes has mounted in it a series of roller bearings 9 engaging directly with the axle and held in position by a suitable cage 10. This cage is mounted within a suitably formed bearing member 11 which is interposed between it and the top interior surface of the journal box; it being noted from Fig. 1, that the outer top surface of said bearing member is convex in form so that it is free to rock to a limited extent relatively to said journal box.

Two wheels 12 of identical construction are mounted on the opposite ends of the axle 5, which, however, at one end is provided with an annular groove or recess 13 designed to receive a tangentially placed bolt or pin 14 mounted in the hub 15 of one of the wheels 13. The other end of the axle however is provided with a straight transverse recess 16 in place of the annular recess formed in the opposite end and while this also receives a bolt or pin 14 tangentially mounted in the hub of the second wheel, it is obvious that this latter is non-revolubly held to said axle by said pin, while the first wheel is free to turn. Both of the wheels have hollow hubs 15 closed at their outer ends, and at their opposite ends projecting into the inwardly flanged, enlarged opening in the outer face of the journal boxes 2; each of these latter having an annular interior recess immediately adjacent to its flanged outer face in which is confined a ring or body of packing 17 whose inner surface engages the projecting portion of the hub 15 and prevents leakage and loss of lubricant as well as access of dirt or grit. The hub of each wheel is provided with a cavity 18 for the reception of lubricant, and this has an opening 19 whereby said lubricant may be delivered directly into the cylindrical space occupied by the end of the axle and a second opening 20 formed at the inner end of the hub whereby the lubricant is delivered into the journal box. For the purpose of introducing the lubricant, which is preferably in the form of solid grease, I provide an opening leading from the outer face of each of the hubs to the cavity 18 and closed by a screw plug 22.

In order to prevent the nuts 3ª on the bolts 3 from backing off, I mount cotter pins 23 in the lower portions of the journal box castings in such positions that their heads and spread ends lie immediately adjacent to the said nuts so as to prevent their turning.

With the above described arrangement of parts, one of the wheels 12 and the axle are free to turn relatively to each other when the car passes around curves, so that its movement is greatly facilitated and may be accomplished without strain or undue wear on any of the parts. Moreover, the bearing members with their rollers and cages are self-adjusting within the journal boxes, while the means for retaining the wheels in their proper relative positions on the axles is of the simplest construction and is designed to permit of the convenient and rapid mounting of the wheels upon said axle or their removal therefrom. The arrangement of parts is such that any end thrust is not taken by the bearing member or by the rollers, or the cage, but is taken by the flanges on the axle, which bear against the journal box 7. The end thrust of the wheels is transmitted through the solid ends of their hubs, which bear directly upon the ends of the axle, so that the bearings 11, cage 10 and rollers 9 are not subject to end thrusts. In some instances I may substitute a plain bearing 11$^a$ for the bearing member 11, as shown in Figs. 6 and 7, without departing from my invention.

I claim:—

1. The combination of a car body; journal boxes therefor; an axle revolubly mounted in said journal boxes; wheels on the axle; roller bearings mounted in each journal box in engagement with the axle; and convex bearing members interposed between the roller bearings and the interior of each journal box.

2. The combination of a car body, journal boxes mounted on opposite sides thereof, an axle revolubly mounted in said journal boxes, wheels having hubs closed at their outer ends and mounted on the ends of the axle, the hub of each of said wheels projecting into the adjacent journal box and having a lubricant cavity placed to communicate directly with the interior of said journal box; a body of packing between the inner end of each journal box and the axle; with a second body of packing between the outer end of the journal box and the adjacent portion of the hub of one of the wheels.

3. The combination with a car body of journal boxes mounted on opposite sides thereof; an axle revolubly mounted in the journal boxes; wheels on the axle; roller bearings in each journal box; and means interposed between each roller bearing and the interior portions of the journal box for permitting a limited rocking motion of the axle relatively to the journal box.

In testimony whereof, I have signed my name to this specification, in the presence of two subscribing witnesses.

JOSEPH STUART.

Witnesses:
WILLIAM E. BRADLEY,
WM. A. BARR.